United States Patent
Cooppan

(10) Patent No.: US 10,778,796 B2
(45) Date of Patent: Sep. 15, 2020

(54) SYSTEMS AND METHOD FOR PROVIDING A PROXY TO UNIVERSAL PLUG AND PLAY DEVICES

(71) Applicant: Verizon Patent and Licensing Inc., Arlington, VA (US)

(72) Inventor: Dayalan Cooppan, Natick, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 213 days.

(21) Appl. No.: 15/945,564

(22) Filed: Apr. 4, 2018

(65) Prior Publication Data

US 2019/0312945 A1 Oct. 10, 2019

(51) Int. Cl.
*G06F 15/173* (2006.01)
*H04L 29/08* (2006.01)
*H04L 12/28* (2006.01)
*H04L 12/24* (2006.01)

(52) U.S. Cl.
CPC ...... *H04L 67/2804* (2013.01); *H04L 12/2818* (2013.01); *H04L 41/12* (2013.01); *H04L 67/02* (2013.01)

(58) Field of Classification Search
CPC . H04L 67/2804; H04L 12/2818; H04L 41/12; H04L 67/02
USPC .......................................................... 709/223
See application file for complete search history.

(56) References Cited

U.S. PATENT DOCUMENTS

| 9,716,623 B2* | 7/2017 | Cooppan | H04L 41/0816 |
| 2005/0074018 A1* | 4/2005 | Zintel | H04L 12/2803 370/401 |
| 2007/0233845 A1* | 10/2007 | Song | H04L 12/2809 709/223 |
| 2010/0064351 A1* | 3/2010 | Johansson | H04L 12/2809 726/4 |
| 2013/0024571 A1* | 1/2013 | Wu | H04L 12/2821 709/225 |
| 2015/0023344 A1* | 1/2015 | Patil | H04L 12/16 370/352 |

OTHER PUBLICATIONS

Mozilla, "HTTP Messages", MDN web docs, (accessible at https://developer.mozilla.org/en-US/docs/Web/HTTP/Messages, visited Apr. 4, 2018).

(Continued)

*Primary Examiner* — Alan S Chou

(57) ABSTRACT

A proxy may provide user equipment ("UE"), operating within or outside a particular Local Area Network ("LAN"), access to different network-connected devices operating within the particular LAN, including access to read data from the devices, write data to the devices, or otherwise configure the devices to perform various tasks, functions, or other actions. The proxy may provide an external network interface to access the network-connected devices of a given LAN by converting and securely exchanging messaging between a first interface that is exposed to the external network, such as the Internet, and a different second interface with which the network-connected devices communicate within the LAN. A single application or user interface, executing on the UE, may also be used to facilitate messaging with the proxy, and access to each of the different network-connected devices on the LAN.

20 Claims, 10 Drawing Sheets

(56) References Cited

OTHER PUBLICATIONS

A. Presser et al., "UPnP Device Architecture 1.1," UPnP Forum, Oct. 15, 2008.
W. Lupton et al., "BasicManagement:2, Service Template Version 1.01," UPnP Forum, Feb. 16, 2012.
A. Bottaro et al., "ConfigurationManagement:2, Service Template Version 1.01," UPnP Forum, Mar. 4, 2013.

* cited by examiner

US 10,778,796 B2

SYSTEMS AND METHOD FOR PROVIDING A PROXY TO UNIVERSAL PLUG AND PLAY DEVICES

BACKGROUND

Network-connected devices may be found in many places, including in the home. For example, one or more network-connected media servers, set-top boxes, WiFi extenders, thermostats, lights, access control devices (e.g., network-connected door lock), network-connected speaker, home hub, camera, or other network-connected, smart, or Internet-of-Things ("IoT") devices may connect to a home local area network ("LAN"). Within the LAN, Universal Plug and Play ("UPnP") may include a set of protocols that provides communication between devices, and that permits UPnP-compliant network-connected devices ("UPnP devices") to discover one another, communicate, control one another, and/or provide various services or commands to one another.

DETAILED DESCRIPTION OF PREFERRED EMBODIMENTS

The following detailed description refers to the accompanying drawings. The same reference numbers in different drawings may identify the same or similar elements.

Systems and/or methods, as described herein, provide a proxy device (sometimes referred to herein simply as "proxy") by which user equipment ("UE"), which is connected to a network that is external to a particular Local Area Network ("LAN"), can access different network-connected devices operating within the particular LAN. Consequently, the UE, via a particular application that communicates directly with the proxy, can command, configure, control, request actions, request data, request services, and/or perform other access of the different network-connected devices in the particular LAN, even when (i) the UE operates from outside the particular LAN, (ii) the network-connected devices do not expose or have their own interface for communicating outside the particular LAN, and/or (iii) the network-connected devices have incompatible or different applications or portals for communicating outside the particular LAN.

Figure 1:
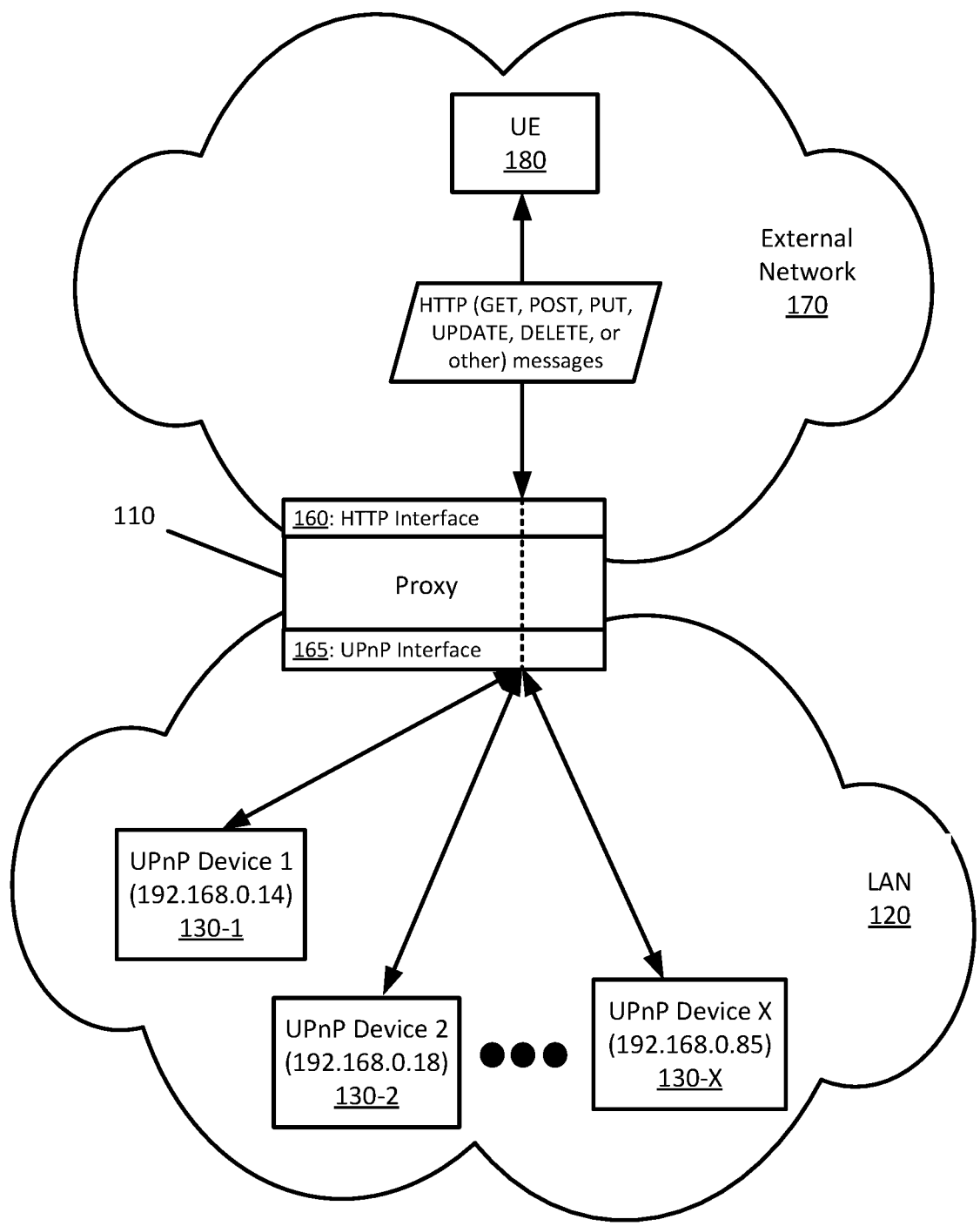
FIG. 1 illustrates an example of a proxy providing a UE, operating in an external network, access to different network-connected devices in a LAN.

For example, as shown in FIG. 1, proxy 110 may provide UE 180, operating in external network 170, access to different network-connected devices 130-1, 130-2, and 130-X (referred to herein collectively as "network-connected devices 130" or individually as "network-connected device 130") in LAN 120. Devices, such as UE 180, operating in external network 170 may represent devices operating throughout the Internet in different LANs than LAN 120. Devices in external network 170 may be connected to different routers, switches, gateways, or other network routing equipment than network-connected devices 130, and may communicate over a different address space than the network-connected device 130. To facilitate the external network 170 access into LAN 120, proxy 110 may create a bridge between a first interface 160 of proxy 110 that is connected to external network 170 and a second interface 165 of proxy 110 that is connected to LAN 120.

UE 180, operating in external network 170, may communicate with proxy 110 by exchanging HTTP messages with interface 160. The HTTP messages may include GET, POST, PUT, UPDATE, DELETE, and other HTTP messages. Hence, interface 160 is illustrated as an HTTP interface. The exchange of HTTP messages may be according to a stateless client-server network communication model. For example, the exchange of HTTP messages between UE 180 and proxy 110 may be based on Representational State Transfer ("REST") or other network communication models. Interface 160 may, in addition to or in lieu of the HTTP protocol, support other application layer (e.g., layer 7 of the Open Systems Interconnection network model) messaging protocols that rely on IP-based routing and/or secure transport via Transport Layer Security ("TLS") or other secure transport protocols.

Each network-connected device 130 may be associated with a different private IP address of LAN 120. The private IP addressing may obscure network-connected devices 130 from UE 180, in that UE 180 may not have a mechanism to access network-connected devices 130 using their respective private IP addresses. Further assume that network-connected devices 130 are Universal Plug and Play ("UPnP") compliant devices. Accordingly, network-connected devices 130 may communicate within LAN 120 based on UPnP-compliant messaging (e.g., UPnP actions). Interface 165 of proxy 110 may support UPnP messaging in order to enable communications between proxy 110 and network-connected devices 130.

Proxy 110 may create a bridge between interface 160 and interface 165 by converting between HTTP messaging used for communications over interface 160 and UPnP messaging used for communications over interface 165. For instance, proxy 110 may produce UPnP-compliant messaging with the correct private IP address associated with a network-connected device 130 in response to HTTP messages originating from UE 180 and routing to interface 160 of proxy 110. Proxy 110 may send the UPnP-compliant messaging through interface 165 across LAN 120 on behalf UE 180. In doing so, proxy 110 may provide UE 180 access to one or more network-connected devices 130, even if the network-connected devices 130 do not expose or have their own interface for communicating outside LAN 120. UE 180 may also use a single application to communicate directly with interface 160 of proxy 110 when accessing each of the network-connected devices 130, even if network-connected devices 130 have incompatible and different device-specific or manufacturer-specific applications with which each device 130 is designed to be accessed.

Proxy 110 may be, or may be communicatively coupled to, a network device, such as a gateway and/or router of LAN 120. Proxy 110 may facilitate device communication between devices operating within LAN 120 (e.g., network-connected devices 130) and devices operating in external network 170 (e.g., UE 180). For example, proxy 110 may assign addressing to network-connected devices 130, and may route, forward, or otherwise direct messaging between network-connected devices 130 and UE 180, as described in detail herein. Proxy 110 may also serve as a gateway between LAN 120 and external network 170. Proxy 110 can perform network address translation or other address obfuscation/mapping, and routing or switching to provide external network 170 accessibility to network-connected devices 130, and to also provide LAN 120 accessibility to devices, such as UE 180, operating in external network 170. In some embodiments, proxy 110 may provide firewall protections, virtual private network ("VPN") access, quality of service, and/or other network functionality. Proxy 110 can also be a standalone device operating in LAN 120 that is separate and distinct from a LAN 120 gateway, router, or other LAN 120 network equipment.

As noted above, network-connected devices 130 may represent independently operating UPnP-compliant devices operating in LAN 120. For instance, each network-connected device 130 may be associated with a different private IP address (e.g., in the 192.168.X.X range for IPv4 addressing, or in the fdXX::/8 range for IPv6 addressing). One or more of network-connected devices 130 may be a UPnP-compliant media server, set-top box, network-connected speaker, wireless hub, WiFi extender, thermostat, light, camera, access control device (e.g., network-connected door lock), or other network-connected, smart, Internet-of-Things ("IoT") device, and/or some other type of UPnP-compliant device.

UE 180 may include any computation and communication device that is capable of network communications with other network-connected devices operating in external network 170 and/or LAN 120. For example, UE 180 may include a device that receives content, such as web pages (e.g., that include text content and/or image content), streams audio and/or video content, or accesses other devices (e.g., commands, configures, controls, requests actions, requests data, requests services, etc.), via one or more applications and/or interfaces, and an Internet connection and/or some other delivery technique. UE 180 may, additionally or alternatively, access voice or calling services over one or more networks, including external network 170. In some implementations, UE 180 may be, may include, or may be a logical portion of, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device. More specifically, UE 180 may include at least one wireless network radio for connecting to and accessing call and/or data services through one or more radio access networks ("RANs").

Figure 2:
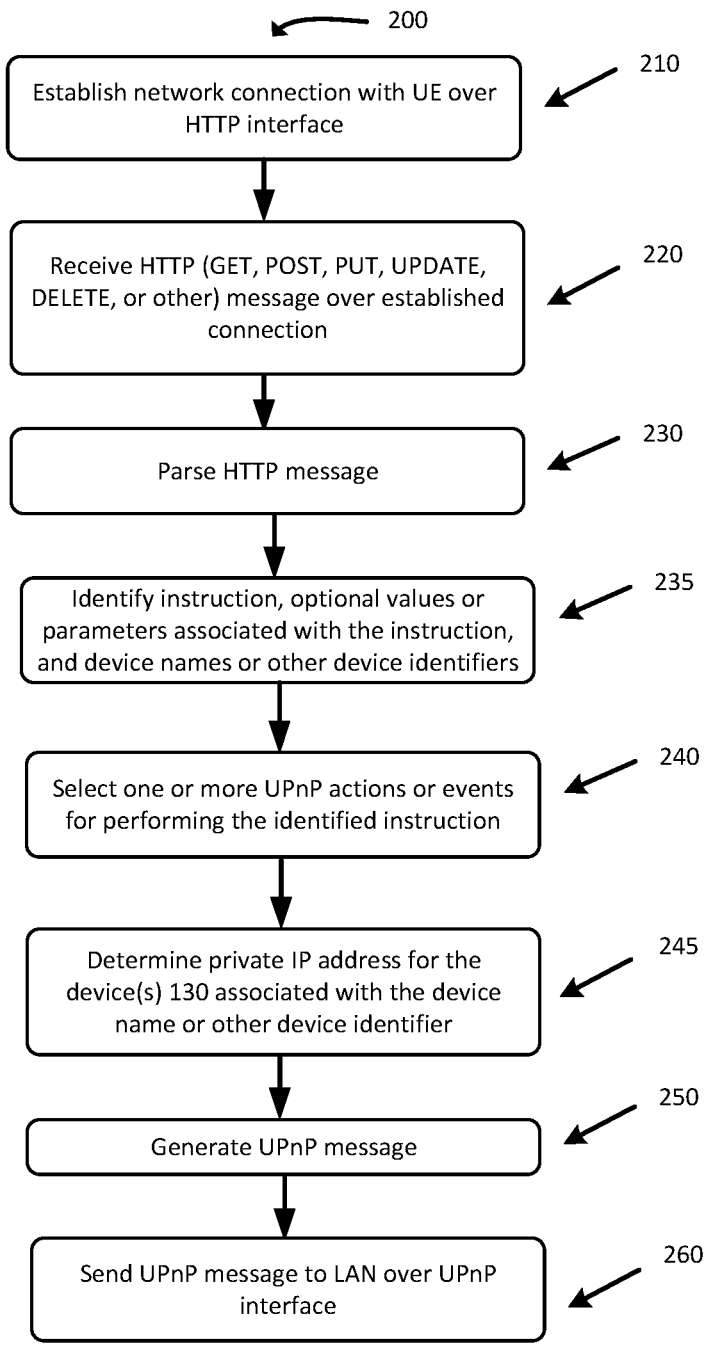
FIG. 2 illustrates an example process for modifying HTTP messaging received over an external network on an HTTP interface of the proxy.

FIG. 2 illustrates an example process 200 for modifying messaging received over external network 170 on HTTP interface 160 to a UPnP-compliant message format that can be distributed from UPnP interface 165, and that can be processed by one or more of network-connected devices 130 operating in LAN 120. Process 200 may, in some embodiments, be performed by proxy 110.

Process 200 may include establishing (at 210) a network connection between UE 180 and HTTP interface 160 of proxy 110. The connection may be a Transmission Control Protocol ("TCP") connection, a secure Transport Layer Security ("TLS") connection, or a connection of other network protocols supported by UE 180 and HTTP interface 160 of proxy 110.

Proxy 110 may receive (at 220) a message from UE 180 over the established connection at HTTP interface 160. The message may be an HTTP message (e.g., GET, POST, PUT, or other HTTP message) with a Uniform Resource Locator ("URL"), header, and/or body that specifies a domain name or IP address, associated with HTTP interface 160 of proxy 110, as the destination of the message. The URL, header, and/or body may further specify a request and a device name (or other device identifier) associated with a network-connected device 130 that is the subject or target of the request. Example URL "example.com/upnp/getsupportedparameters/device_y/ . . . " may specify a domain name (e.g., "example.com") that resolves to proxy 110, may identify a particular instruction based on the URL path "/getsupportedparameters", and may identify a particular network-connected device 130 for the particular instruction based on the URL path "/device_y". This and other messaging received (at 220) from UE 180 may not be UPnP-compliant messaging, because the messages may (i) route to proxy 110, via a domain name or IP address associated with HTTP interface 160, instead of a private IP address that is associated with a network-connected device 130, (ii) specify application programming interface (API) instructions instead of UPnP defined actions or events, and/or (iii) specify instructions in a non-UPnP compliant format (e.g., "example.com/upnp/getsupportedparameters/device_y/ . . . ").

Proxy 110 may convert the message (received at 220) to a UPnP-compliant message. Converting to a UPnP-compliant message may include parsing (at 230) the message URL, header, and/or body.

Based on the parsing, proxy 110 may identify (at 235) an instruction and optional values or parameters associated with the instruction (e.g., instruction to turn WiFi 2.4 Ghz radio to a value of on, and instruction to set WiFi Service Set Identifier ("SSID") for 2.4 Ghz radio to a value of "XYZ") as a result of the parsing. Proxy may also identify (at 235) one or more names or other identifiers for one or more network-connected devices 130 that are targets or subjects of the instruction.

Proxy 110 may select (at 240) one or more UPnP actions or events (see, e.g., UPnP standards "UPnP™ Device Architecture 1.1", UPnP Forum, Oct. 15, 2008; see also "Basic-Management: 2 Service Template Version 1.01", UPnP Forum, Feb. 16, 2012; see also "ConfigurationManagement: 2 Service Template Version 1.01", UPnP Forum, Mar. 4, 2014) for performing the identified instruction. For instance, an instruction for configuring channel selection on a particular WiFi router may result in the selection of one or more of the UPnP GetSupportedDataModels( ), GetSupportParameters( ), SetValues( ), SetAttributes( ), GetValues( ), and/or GetAttributes( )actions.

Proxy 110 may determine (at 245) the private IP address for the device(s) 130 associated with the identified name or other identifier. As will be described in detail below with reference to FIG. 4, proxy 110 may obtain the private IP addresses and the identifying names or other identifiers for the network-connected devices 130 of LAN 120, and may store a mapping between the private IP addresses and identifying names or other identifiers in response to performing UPnP device discovery. Consequently, proxy 110 may determine that the identifying name "device_y" in the example URL "example.com/upnp/getsupportedparameters/device_y/ . . . " is associated with the private IP address assigned to network-connected device 130-2 (e.g., 192.168.0.18 as shown in FIG. 1).

Proxy 110 may generate (at 250) a UPnP message based on the actions or events (selected at 240) and private IP address (determined at 245). For instance, proxy 110 may generate a UPnP message that is addressed to the private IP address of network-connected device 130-2 (e.g., 192.168.0.18), and that specifies the SetValues( )action with a parameter-value pair list for configuring a list of configurable parameters of network-connected device 130-2 with specific values.

Proxy 110 may send (at 260) the UPnP message (generated at 250) through UPnP interface 165. The UPnP message can be sent to one or more of the network-connected devices 130, as detected at block 235. In some embodiments, proxy 110 may broadcast or multicast the UPnP message to multiple network-connected devices 130 of LAN 120, or forward the UPnP message to one or more specific devices 130 by forwarding the UPnP message to one or more private IP addresses associated with one or more of network-connected devices 130.

Figure 3:
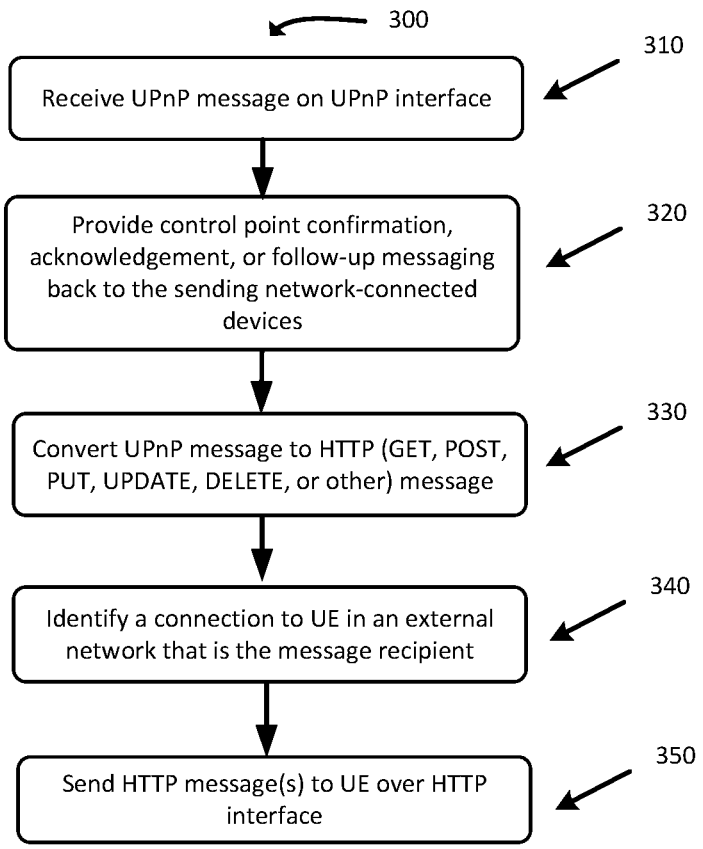
FIG. 3 illustrates an example process for modifying UPnP messaging received over a LAN on a UPnP interface of the proxy.

FIG. 3 illustrates an example process 300 for modifying UPnP messaging received over LAN 120 on UPnP interface 165 for distribution from HTTP interface 160 as HTTP messaging that can be routed to and processed by UE 180 operating in external network 170. Process 300 may, in some embodiments, be performed by proxy 110.

Process 300 may include receiving (at 310) a UPnP message from a network-connected device 130 on UPnP interface 165. The established UPnP control point of proxy 110 may provide (at 320) any confirmation, acknowledgement, or follow-up messaging back to the sending network-connected device 130.

Proxy 110 may convert (at 330) the UPnP message (received at 310) to a message that can be forwarded to UE 180, and processed by a UE 180 application that facilitates UE 180 access to network-connected devices 130 via proxy 110. For example, proxy 110 may extract data that is in a first UPnP-compliant format (e.g., a nested dot format—devicename.servicename.servicetype) from the UPnP message, change the data to a different format (e.g., key-value pairs), and encapsulate the changed data in an HTTP message (e.g., as URL query string arguments or in the HTTP message body). For instance, the converted HTTP message may include a URL "~/upnp/devices?pathID=device_y&servicetype=2.4 Ghz&SSID=XYZ" that identifies the value that is configured for the SSID (e.g., "XYZ") of the 2.4 Ghz radio of a particular network-connected device 130 (e.g., "device_y"). Proxy 110 may also process data that is extracted from the UPnP message before encapsulating the data in the HTTP message. In processing the data, proxy 110 may remove extraneous data fields or values. For example, the UPnP message may include a list of UPnP instances or objects that were traversed in order to obtain a requested value for a specific object (e.g., 2.4 Ghz radio SSID). Proxy 110 may remove the traversed instance or object hierarchy, and simply include the request value for the specific object in the HTTP message that is returned to a requestor. In processing the data, proxy 110 may aggregate data from UPnP messaging of two or more network-connected devices 130 into a single HTTP response. For example, proxy 110 may perform device discovery to identify the network-connected devices 130 on LAN 120. Rather than send individual messages for each discovered device 130 to UE 180, proxy 110 may aggregate the information and send one HTTP message to UE 180 that identifies all discovered devices 130 on LAN 120.

Proxy 110 may identify that the UPnP message was sent in response to messaging originated by UE 180. Accordingly, proxy 110 may identify (at 340) an established connection to UE 180 on HTTP interface 160, if the connection exists (e.g., a connection-oriented protocol was used and the connection was not terminated), and may send (at 350) the converted HTTP message from HTTP interface 160 over external network 170 to UE 180. Proxy 110 may also communicate with UE 180 using different message formats, network protocols, and/or network technologies. For example, proxy 110 may send a Short Messaging Service ("SMS"), Multimedia Messaging Service ("MMS") message, IP message, and/or other proprietary message (e.g., Domain Account Subdomain Module Object message format) to UE 180. Thus, the messages sent from UE 180 to proxy 110 may be in a different message format or network protocol than the messages proxy 110 sends to UE 180.

Figure 4:
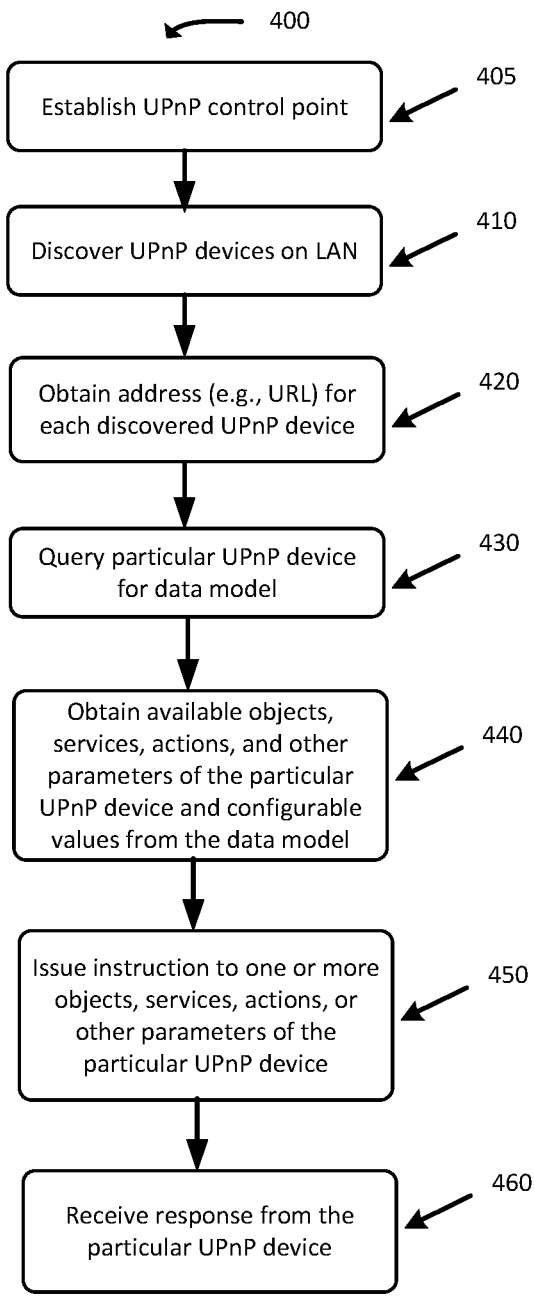
FIG. 4 illustrates an example process for enabling access between a UE operating in an external network, and network-connected devices operating in a LAN via the proxy.

FIG. 4 illustrates an example process 400 for enabling access between UE 180 operating in external network 170, and network-connected devices 130 operating in LAN 120 via proxy 110. Process 400 may, in some embodiments, be performed by proxy 110.

Process 400 may start with proxy 100 establishing (at 405) itself as a UPnP control point of LAN 120. The UPnP control point may be a device designated within LAN 120 for command and control over other UPnP-compliant devices (e.g., network-connected devices 130) operating in LAN 120.

As a UPnP control point, proxy may discover (at 410) network-connected devices 130 that operate on LAN 120. The device discovery may be initiated in response to a request from UE 180. Proxy 110 may also perform device discovery independent of a request from UE. In this case, proxy 110 may store the information about any discovered devices 130, and may provide the information to UE 180 upon request.

Proxy 110 may obtain (at 420) addressing for each network-connected device 130 that is discovered as a result of performing the device discovery. In particular, proxy 110 may obtain a name, URL, or other identifier identifying a particular network-connected device 130, as well as, an IP address associated with that particular network-connected device 130 on LAN 120. Proxy 110 may store a mapping of the name, URL, or other identifier to the IP address.

Figure 5:
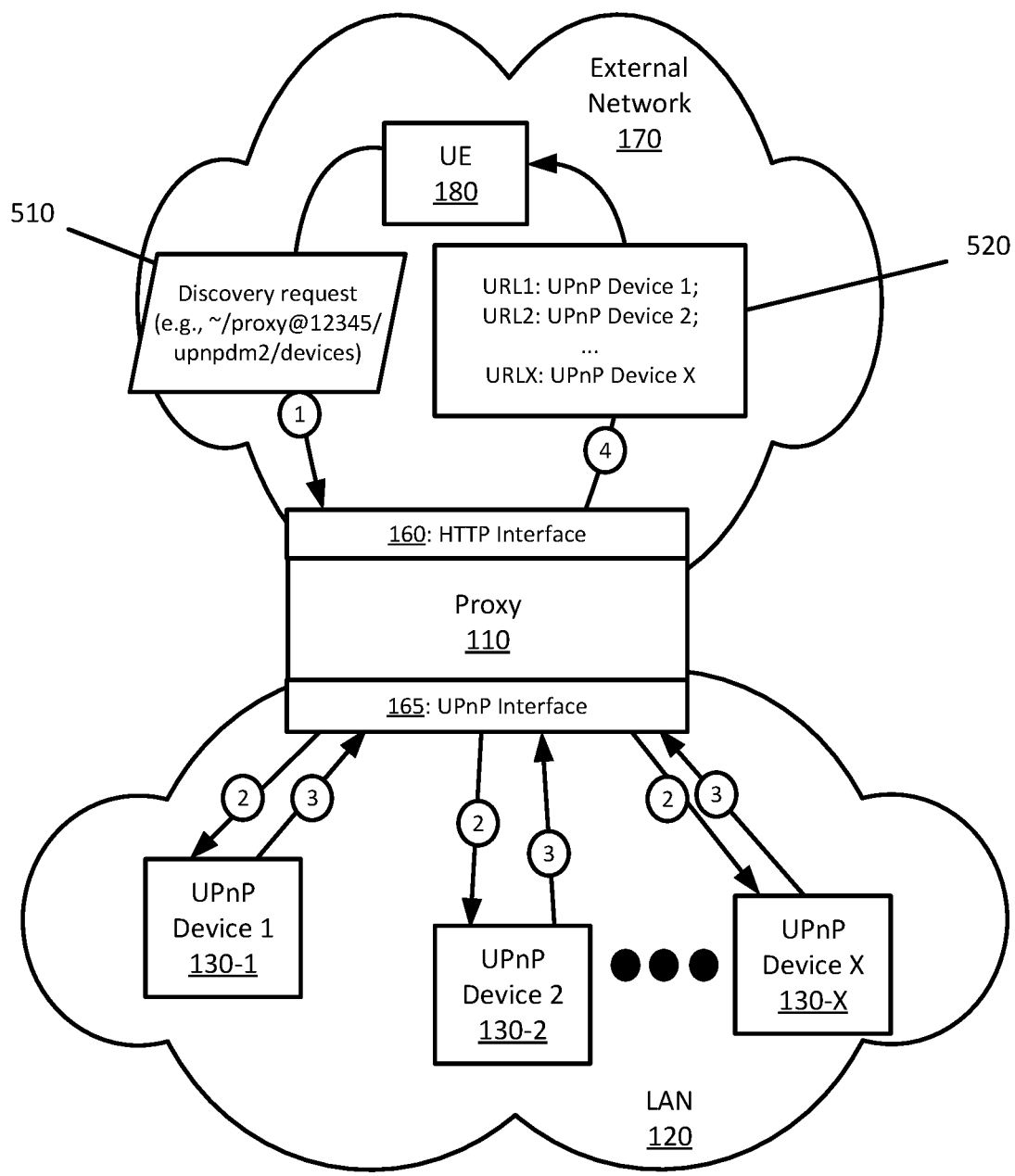
FIG. 5 illustrates an example of the proxy performing device discovery based on a request from a UE.

FIG. 5 illustrates an example of proxy 110 performing device discovery based on a request from UE 180. UE 180 may issue (at 510) a discovery request through external network 170 to HTTP interface 160 of proxy 110. The discovery request may be encapsulated as an HTTP GET request. The discovery request may be directed to proxy 110 based on a URL of the request specifying a domain name or path associated with proxy 110 or LAN 120. The domain name or path may resolve to an IP address associated with HTTP interface 160 of proxy 110. The URL may also specify the discovery request operation. Example URL "~/proxy@12345/upnpdm2/devices" includes a first path segment (e.g., "proxy@12345") that may identify the destination as proxy 110, and a second path segment (e.g., "upnpdm2/devices") that may identify a request for discovering devices in LAN 120 in which proxy 110 operates. Proxy 110 may interpret "upnpdm2" to mean that a specific UPnP request is to follow, and "devices" as identification of the specific UPnP request (e.g., a device discovery request).

Although not illustrated in FIG. 2 or FIG. 4, the discovery request or other message from UE 180 may first route to a server, such as a broadband communications server ("BCS"), of a network service provider. For instance, the URL of the discovery request may specify a domain name of the network service provider, and different path segments identifying proxy 110 and an instruction for performing device discovery. The domain name may resolve to an IP address of the BCS. Consequently, the request routes from UE 180 to the BCS. The BCS may then inspect the URL to identify the path segment containing a name identifier for proxy 110. The BCS may store a mapping of different proxy names (e.g., "proxy@12345") to specific IP addresses or URLs based on the network service provider provisioning different proxy devices (e.g., proxy 110) to different customers or users for operation of the proxy devices (e.g., proxy 110) in different customer LANs (e.g., LAN 120). The network service provider may also provision one or more of the network-connected devices (e.g., network-connected devices 130) operating in the customer LAN.

In response to receiving (at 510) the discovery request over HTTP interface 160, proxy 110 may convert and output an equivalent UPnP-compliant message through UPnP interface 165. In some embodiments, outputting the UPnP-compliant message may cause proxy 110 to perform an UPnP M-Search from interface 165. In performing the UPnP M-Search, proxy 110 may pass a User Datagram Protocol ("UDP") message to a particular multicast address and port (e.g., 239.255.255.250:1900) that other UPnP devices join upon initialization. Proxy 110 can alternatively perform the UPnP M-Search with a discovery protocol, such as the Simple Service Discovery Protocol ("SSDP"). For example, proxy 110 may actively search for the network-connected devices 310 via the SSDP protocol, or listen for SSDP alive messages from the network-connected devices 130 in order to build a list of active UPnP devices operating on LAN 120. The network-connected devices 130 may be configured to broadcast the SSDP alive messages or directly send the SSDP alive message to an established UPnP control point (e.g., proxy 110).

In response to the UPnP search, each network-connected device 130 may provide a response to interface 165 (e.g., the source IP address and port associated with interface 165) of proxy 110. The response from each network-connected device 130 may include the private IP address associated with the responding device 130 on LAN 120, a name of the discovered device 130 (e.g., path identifier), one or more UPnP services and/or services types supported by the discovered device 130, service URL for each identified service, and/or other identifiers. The response information may be provided in a nested dot format (e.g., devicename.servicename.servicetype).

Proxy 110 may receive the responses from the discovered devices (e.g., network-connected devices 130). Proxy 110 may encapsulate the discovered device information (e.g., name, services, service types, service URL, and other identifiers) in one or more HTTP messages that proxy 110 may provide (at 520) to UE 180 through HTTP interface 160. Proxy 110 may immediately provide the discovered device information to UE 180 when proxy 110 performs the device discovery independent of the request from UE 180 (received at 510). In some embodiments, proxy 110 may be configured with a list that restricts or permits which discovered devices may be presented to a device in external network 170 (e.g., UE 180). For instance, proxy 110 may be configured to obscure certain network-connected devices 130 from UE 180 for security reasons. As noted with reference to 420 of FIG. 4, proxy 110 may locally store the discovered device information in order to build the mapping table that associates the names, service URLs, and other identifiers to the IP addresses of the responding network-connected devices.

Based on the device discovery information provided (at 520) by proxy 110, UE 180 may individually access each network-connected device 130 of LAN 120. UE 180 may access each device 130 for further device discovery information including the device data model.

With reference back to FIG. 4, proxy 110, as an established UPnP control point, may query (at 430) a network-connected device 130 of LAN 120 for that device's data model. The data model may be a file or list that enumerates one or more of the available settings, commands, services, features, functions, and/or other remotely configurable objects of the queried device 130, as well as different configurable values for the identified settings, commands, services, features, functions, and/or configurable objects. In response to the data model query of a particular network-connected device 130, proxy 110 may receive (at 440) the data model for that particular network-connected device 130.

Figure 6:
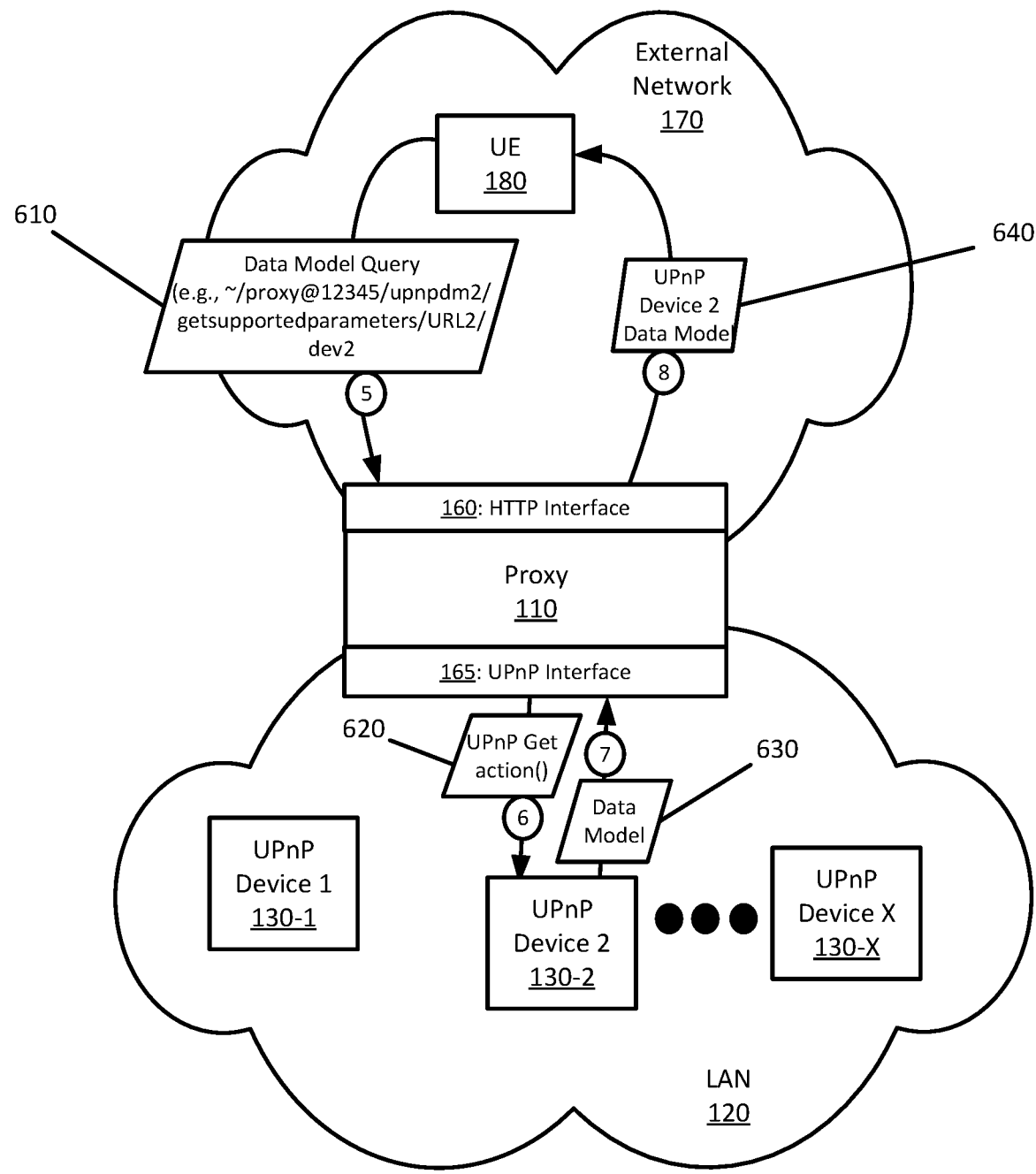
FIG. 6 illustrates an example of the proxy performing the data model query of a network-connected device in a particular LAN.

FIG. 6 illustrates an example of proxy 110 performing the data model query of network-connected device 130-2 in LAN 120. The data model query may be initiated in response to UE 180 issuing (at 610) a query for the data model of network-connected device 130-2. UE 180 may issue the data model query based on the device discovery information obtained from FIG. 5, and the device discovery information identifying network-connected device 130-2 as a network-connected device 130 operating in LAN 120. The data model query from UE 180 may be an HTTP GET request. The HTTP GET request may have an example URL "~/proxy@12345/upnpdm2/getsupportedparameters/URL2/dev2" that identifies proxy 110 (e.g., "proxy@12345), the data model query (e.g., "getsupportedparameters"), and the targeted network-connected device 130-2 (e.g., "URL2/dev2"). In some embodiments, proxy 110 may initiate the data model query of network-connected device 130-2 and other discovered network-connected devices 130 independent of the query from UE 180 or other devices.

Proxy 110 may receive (at 610) the query on HTTP interface 160. Proxy 110 may convert the query to a UPnP-compliant query. For instance, proxy 110 may convert the HTTP GET request to GetSupportedParameters( )UPnP action. Proxy 110 may also convert the name, URL, or other identifier, identifying network-connected device 130-2, to the private IP address associated with network-connected device 130-2 in LAN 120. Proxy 110 may then issue (at 620) the UPnP action from UPnP interface 165.

In response to the UPnP action, network-connected device 130-2 may return (at 630) to proxy 110, via UPnP interface 165, a file or other list of available settings, commands, services, features, functions, and/or other remotely configurable objects of network-connected device 130-2, as well as, different configurable values for the identified settings, commands, services, features, functions, and/or configurable objects. Proxy 110 may encapsulate this additional device discovery information in one or more HTTP messages, and may provide (at 640) the one or more HTTP messages to UE 180 in resolution of the original query.

UE 180 may use the data model, obtained from a particular network-connected device 130 in LAN 120, in order to issue specific instructions that target specific objects, identified in the data model, of the particular network-connected device 130. For example, UE 180 may issue an instruction to read data from specific objects of the particular network-connected device 130 that are identified in the data model of the particular network-connected device 130. UE 180 may also issue an instruction to write data to specific objects of the particular network connected device 130 that are identified in the data model of the particular network-connected device 130. The writing of data can include changing settings, invoking commands, executing services, requesting features, performing functions, or configuring other objects of the particular network-connected device 130. UE 180 may provide one or more such instructions to proxy 110 via the HTTP interface 160. With reference back to FIG. 4, proxy 110 may convert the instructions from the HTTP messaging format to a UPnP-compliant format, may perform address mapping, and may issue (at 450) the UPnP-compliant instruction from the UPnP interface 165 to the particular network-connected device 130 in LAN 120.

Proxy 110 may receive (at 460) a response from the particular network-connected device 130 after issuing an instruction. The response may provide the requested read data or confirmation that a write was performed.

Figure 7:
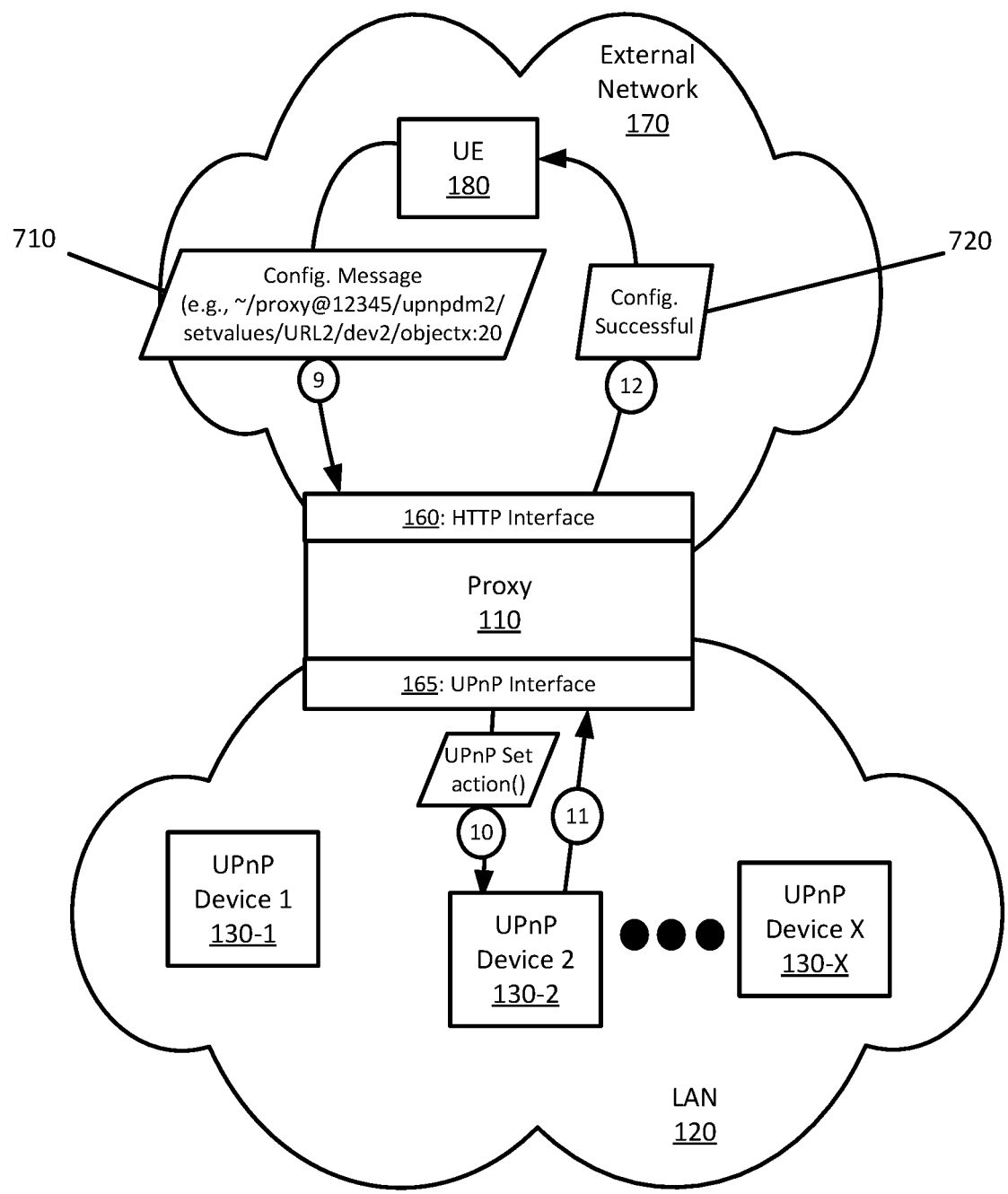
FIG. 7 illustrates an example of a UE configuring a particular object of a network-connected device via the proxy.

FIG. 7 illustrates an example of UE 180 configuring a particular object of network-connected device 130-2 via proxy 110. UE 180 may issue (at 710) an HTTP PUT, POST, UPDATE, or other message that identifies network-connected device 130-2, and that includes an instruction to configure a particular object of network-connected device 130-2, wherein a name, URL, or other identifier of network-connected device 130-2 may be identified from the device discovery illustrated by FIG. 5, and wherein the particular object, as well as configurable values of the particular object may be identified from the data model query of network-connected device 130-2 illustrated by FIG. 6. Example URL "~/proxy@12345/upnpdm2/setvalues/URL2/dev2/objectx: 20" may include a first path segment (e.g., "proxy@12345") identifying the destination as proxy 110, a second path segment (e.g., "setvalues") identifying a write or configuration instruction, a third path segment (e.g., "/URL2/dev2") identifying network-connected device 130-2 for executing the instruction, and a fourth path segment (e.g., "object:20") identifying a specific value to write to a specific object of network-connected device 130-2.

The HTTP message may directly route to proxy 110 in response to the message specifying a destination IP address associated with HTTP interface 160 of proxy 110, or a URL with a domain name that resolves to the IP address associated with HTTP interface 160 of proxy 110. The HTTP message may indirectly route to proxy 110 in response to the message specifying a destination IP address or domain name associated with a BCS or other management server of a service provider that then forwards the message to proxy 110 based on a name, address, or other identifier being specified in the message URL, header, body, or other field.

Proxy 110 may convert the HTTP message to a UPnP-compliant message, map a name, URL, or other identifier for network-connected device 130-2 identified in the HTTP message to an IP address associated with network-connected device 130-2 on LAN 120, and/or send the UPnP-compliant message from UPnP interface 165. In this figure, proxy 110 maps the HTTP message to a UPnP SetValues( )action with parameters identifying the targeted object (e.g., objectx) and the desired value for the targeted object (e.g., 20).

Network-connected device 130-2 may configure the particular object with the value specified as part of the SetValues( )action in response to receiving the UPnP-compliant message from proxy 110. Network-connected device 130-2 may then provide a response to proxy 110, and proxy 110 may provide (at 720) a status or configuration message to UE 180.

Based on the access provided by proxy 110 to UE 180, UE 180 can submit additional read and write instructions to network-connected device 130-2 or other devices (e.g., network-connected devices 130) of LAN 120. Proxy 110 supports any read and write instruction (e.g., action or event) of the UPnP protocol including, without limitation, GetSupportedDataModels( ), GetSupportedParameters( ), GetInstances( ), GetValues( ), GetSelectedValues( ), SetValues( ), CreateInstance( ), DeleteInstance( ), GetAttributes( ), SetAttributes( ), GetInconsistentStatus( ), GetConfigurationUpdate( ), GetCurrentlyConfigurationVersion( ), GetAlarmsEnabled( ), SetAlarmsEnabled( ), and custom defined actions. For instance, UE 180 may send a request to read the SSID advertised from a 2.4 Ghz radio of a network-connected device 130 operating as a WiFi access point on LAN 120. The request URL may specify "~/proxy@12345/upnpdm2/getvalues/URL1/dev1[ParameterPath==/UPNP/DM/GuestWiFi/WiFi24 GhzSSIDName]". A BCS server initially receiving this request from UE 180 can identify that the request is directed to proxy 110 based on the path segment "proxy@12345", and may forward the request to proxy 110. Proxy 110 can then determine that the message is intended for network-connected device 130 based on the path segment "URL1/dev1". Moreover, proxy 110 can convert the HTTP message to a UPnP GetValues( )action based on the path segment "getvalues", and direct the instruction to the specific requested object based on the path segment "ParameterPath==/UPNP/DM/GuestWiFi/WiFi24 GhzSSIDName]". Network-connected device 130 may return the requested data field (e.g., SSID for the 2.4 GHz radio) to proxy 110. Proxy 110 may then encapsulate the returned data in an HTTP message, and may provide the HTTP message to UE 180 through external network 170.

UE 180 can also perform more complicated forms of access via proxy 110. For example, UE 180 can request network-connected device 130-X to perform a traceroute operation. From the data model of network-connected device 130-X, UE 180 may identify that the traceroute operation is associated with several objects including, for example, objects for configuring the traceroute destination host, timeout in milliseconds, maximum hop count (e.g., time-to-live), and other objects. Accordingly, the HTTP message from UE 180 may specify a request for the traceroute service and configure values for each of the destination host, timeout, maximum hop count, and other objects.

Proxy 110 may operate as an UPnP control point to invoke the corresponding UPnP action on network-connected device 130-X with a sequence of UPnP messaging. In particular, the control point of proxy 110 may issue a first UPnP action (e.g., Traceroute( ) for requesting the traceroute service from network-connected device 130-X. Device 130-X may return an identifier (e.g., "Test_123") that it assigns for the requested service. The control point of proxy 110 may then issue a second UPnP action (e.g., GetTracerouteResults(Test_123)) for requesting results for the traceroute service identified by the identifier from network-connected device 130-X. Device 130-X may return the results to the control point of proxy 110. Proxy 110 can then return the results to UE 180 via the HTTP interface 160.

Figure 8:
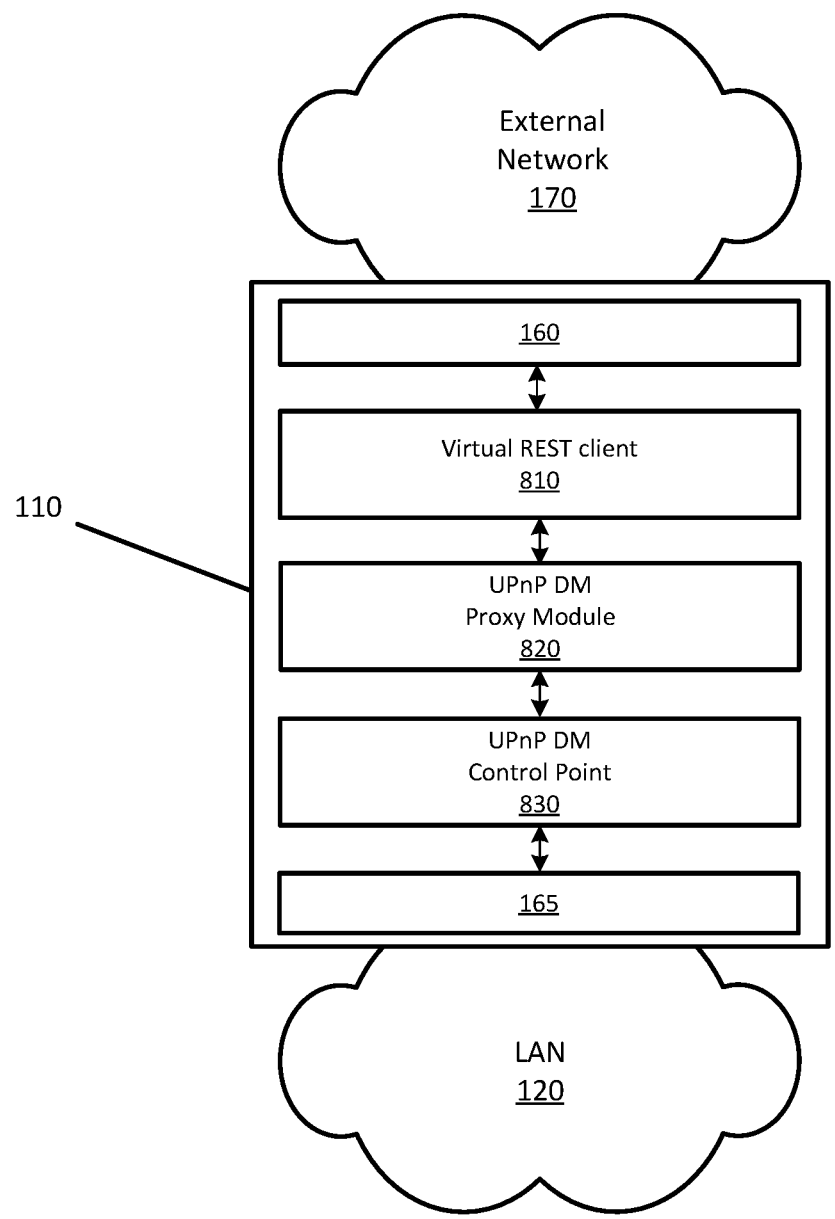
FIG. 8 illustrates example modules of the proxy for establishing an external network interface to network-connected devices operating in different LANs.

FIG. 8 illustrates example modules of proxy 110 that establish an external network interface to network-connected devices operating in different LANs. As shown, the modules may include virtual REST client 810, UPnP DM proxy module 820, and UPnP DM control point 830.

Virtual REST client 810 may listen on HTTP interface 160 for external network 170 HTTP messages that are directed to proxy 110 or network-connected devices (e.g., devices 130-1, 130-2, and 130-X) operating in the same LAN (e.g., LAN 120) as proxy 110. Virtual REST client 810 can conduct a stateless client-server exchange (e.g., based on the REST communication model) with UE 180 and other devices operating in external network 170, wherein the stateless client-server exchange can include receiving a device discovery request from UE 180, and providing the listing of discovered network-connected devices 130 operating in LAN 120 back to UE 180 in reply to the request.

UPnP DM proxy module 820 may perform the conversions for the messaging passing between HTTP interface 160 and UPnP interface 165. For instance, UPnP DM proxy module 820 may convert an HTTP GET request with a URL for device discovery to an UPnP M-Search, convert an HTTP GET request with a URL for querying a device data model to an UPnP GetSupportedParameters( )action, and convert an HTTP GET request with a URL for reading data values of a specific object to an UPnP GetValues( )action. UPnP DM proxy module 820 may also perform the address mapping for mapping device names, URLs, or other identifiers specified as part of the HTTP message to a private IP address assigned to the corresponding network-connected device in the LAN.

UPnP DM control point 830 may be established as a UPnP control point for LAN 120. UPnP DM control point 830 may command and control other UPnP devices (e.g., network-connected devices 130) operating on LAN 120. In acting as a control point, UPnP DM control point 830 may have logic to complete various request-response exchanges that occur between a UPnP control point and network-connected devices when the UPnP control point requests data, execution of services, or other operations form the network-connected devices.

As proxy 110 provides UE 180 with a single point of access to the network-connected devices (e.g., network-connected devices 130) that operate in a LAN (e.g., LAN 120), some embodiments provide UE 180 with an application that may present a single interface to simplify user access to the different devices. User access may be complicated because of the large number of available objects in each data model returned as a result of the data model querying, the usage, purpose, or meaning of these objects, as well as the affect that different configurable values may have on these different objects. The data model objects and the usage of those objects may be beyond a user's scope of knowledge or understanding. Accordingly, the application may present user interface elements for a subset of key objects. The user interface elements may provide usage explanations that simplify or condense information from a first subset of objects of the data model. The user interface elements may also provide interactive means with which a user can adjust or configure those key objects. In summary, the application may analyze or process information that is returned in the data models on behalf of the user, present a graphical user interface with user friendly representation of the information, and/or present user interface elements to adjust various objects of the data models related to the information.

For example, the data model associated with a wireless access point may include objects that identify the signal-to-noise ratio, signal-to-interference ratio, signal-to-interference-plus-noise ratio, packet loss, packet latency, jitter, bandwidth, and/or other objects that are indicative of signal quality on different wireless radios of the access point (e.g., 2.4 Ghz or 5 Ghz) or on different channels of a given radio. This information may be too technical for a user. Accordingly, the application processes the information from the data model on behalf of the user. The application may present a single signal quality metric for each of the available channels or radios based on the processed information, so that the user can make a quick assessment of signal quality rather than understand the nuances of the signal-to-noise ratio, signal-to-interference ratio, signal-to-interference-plus-noise ratio, packet loss, packet latency, jitter, bandwidth, and/or other objects that are indicative of signal quality. The application may also provide one or more user interface elements with which the user can switch channels or radios via the application without manually configuring the objects and object values from the data model that cause the access point to switch channels or radios.

Figure 9:
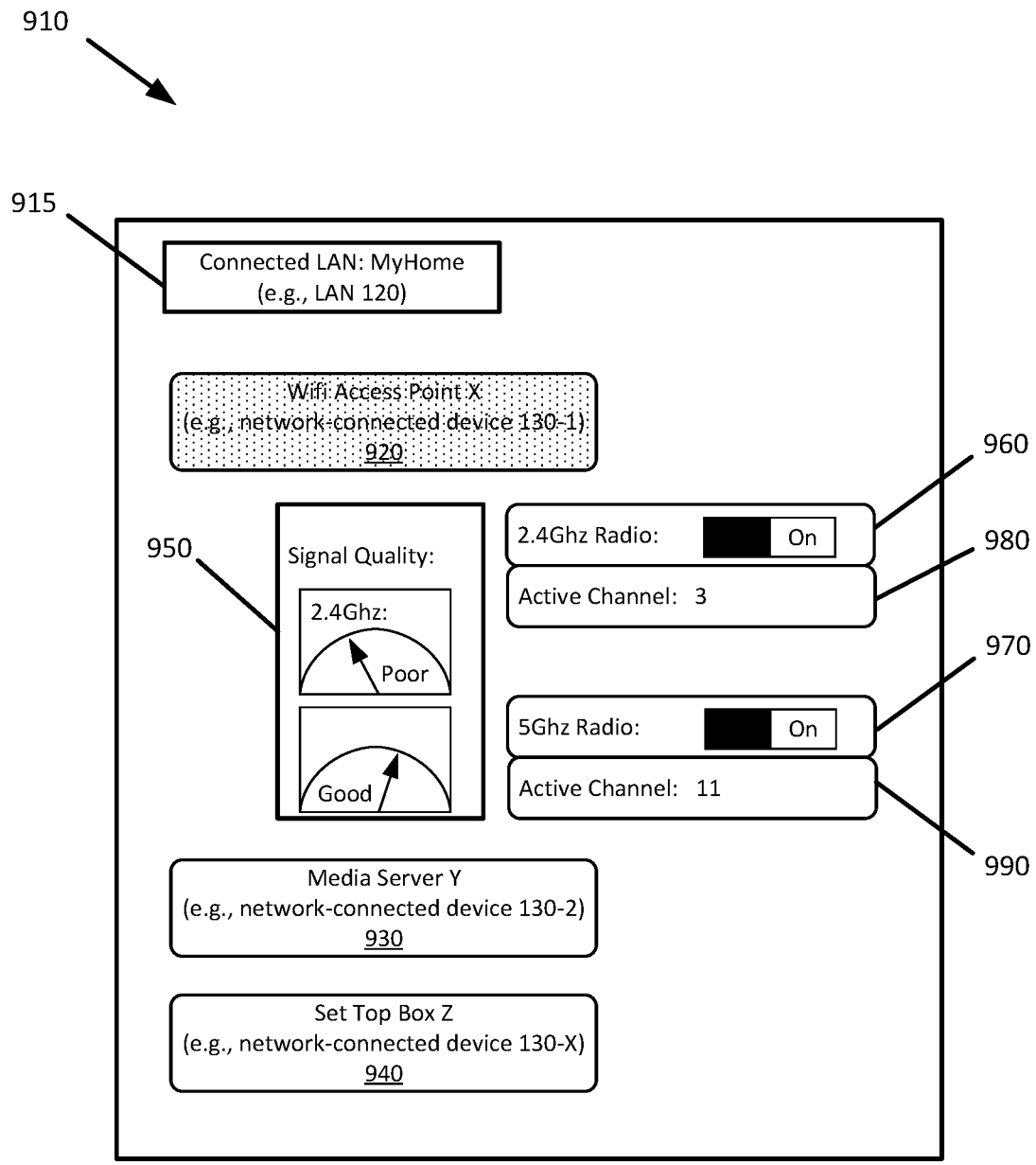
FIG. 9 illustrates example user interface, which may be associated with an application for providing a single interface for accessing network-connected devices of a LAN via the proxy, and network-connected devices operating in other LANs via different instances of the proxy operating in each of the other LANs.

FIG. 9 illustrates example user interface 910, which may be associated with an application for providing a single interface for accessing network-connected devices 130 of LAN 120 via proxy 110, and network-connected devices operating in other LANs via different instances of proxy 110 operating in each of the other LANs. User interface 910 may be presented on a display of UE 180 in response to UE 180 executing the corresponding application.

User interface 910 may provide an indicator 915 for a currently connected LAN. For instance, in this figure, indicator 915 shows that UE 180 (e.g., the device on which user interface 910 is shown) is connected to a LAN named "MyHome". Assume for the purposes of FIG. 9 that "MyHome" is an identifier for LAN 120.

Upon connecting to LAN 120, and more specifically, to proxy 110 operating on LAN 120, UE 180, via execution of the application or user input received through the user interface 910, may request device discovery from proxy 110. As discussed above, proxy 110 may perform device discovery or may maintain a current list of active UPnP devices on LAN 120 by passively listening for alive messages from the UPnP devices on UPnP interface 165. Proxy 110 may provide UE 180 with the list of discovered UPnP devices.

The application may receive the list of discovered UPnP devices, and may update the user interface 910 to present selectable elements 920, 930, and 940 representing network-connected devices 130 discovered on LAN 120. If UE 180 connects to a different second LAN (identified via indicator 915), user interface 910 would update to present a different set of selectable elements for different network-connected devices discovered on the second LAN.

In FIG. 9, assume that element 920 is selected (e.g., by a user of UE 180). In response to the selection of element 920, UE 180 may request from proxy 110, the data model for network-connected device 130 represented by selected element 920. Alternatively, proxy 110 may provide the data models for the discovered devices to UE 180 (for the application presenting user interface 910) prior to user selection of any of the selectable elements 920, 930, and 940.

User interface 910 may then present various information from the data model of the corresponding device 130 related to selected element 920, as well as one or more configurable settings, commands, or executable actions related to selected element 920. For instance, selection of element 920 may cause user interface 910 to present statistics 950 about signal quality on the 2.4 Ghz radio and 5 Ghz radio of device 130, user interface elements 960 and 970 for turning on and off the 2.4 Ghz and 5 Ghz radios of device 130, and user interface elements 980 and 990 for switching between available channels on each radio. Should the user interact with element 980 and change the channel for the 2.4 Ghz radio, the application can generate the HTTP message for changing the values of the one or more objects from the data model that control the selected channel for the 2.4 Ghz radio. UE 180 may provide the HTTP message to proxy 110. Proxy 110 then performs the configuration change on network-connected device 130 with the proper UPnP messaging.

Figure 10:
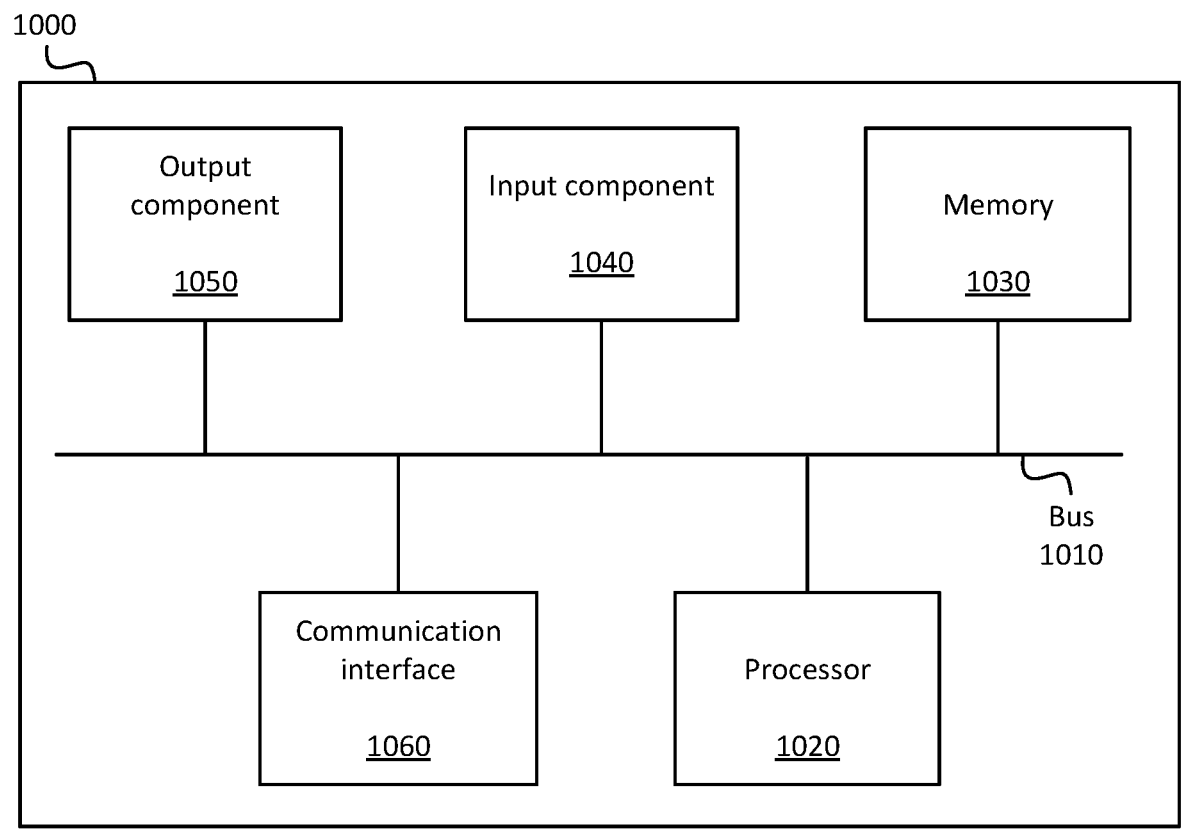
FIG. 10 illustrates example components of one or more devices, according to one or more embodiments described herein.

FIG. 10 is a diagram of example components of device 1000. Device 1000 may be used to implement certain of the devices described above. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIGS. 5-9, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms) Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A proxy device, comprising:
   a non-transitory computer-readable medium storing a set of processor-executable instructions; and
   one or more processors configured to execute the set of processor-executable instructions, wherein executing the set of processor-executable instructions causes the one or more processors to:
      receive, on a first interface of the proxy device connected to a first network that utilizes a first address space, a Hyper Text Transfer Protocol ("HTTP") message comprising a Uniform Resource Locator ("URL"), the URL comprising:
         a first identifier identifying a Universal Plug and Play ("UPnP") device on a second network that utilizes a second address space that is different from the first address space, and
         a second identifier specifying an action to perform with respect to the UPnP device;
      determine, based on the first identifier, a particular address, in the second address space, that is associated with the UPnP device on the second network, wherein the first identifier and the particular address associated with the UPnP device are different; and
      perform the action, using the determined particular address in the second address space and from a different second interface of the proxy device that is connected to the second network, with respect to the UPnP device on the second network.

2. The proxy device of claim 1, wherein the processor-executable instructions further include processor-executable instructions to:
   discover a plurality of UPnP devices on the second network based on messaging obtained on the second interface, wherein the plurality of UPnP devices comprises the UPnP device.

3. The proxy device of claim 2, wherein the processor-executable instructions to discover the plurality of UPnP devices include processor-executable instructions to:
   receive a different address, in the second address space, and a different identifier for each UPnP device of the plurality of UPnP devices.

4. The proxy device of claim 3, wherein the processor-executable instructions further include processor-executable instructions to:
   provide the address, in the second address space, and the respective identifier for each UPnP device of the plurality of UPnP devices to a particular user equipment ("UE") operating in the first network via the first interface.

5. The proxy device of claim 2, wherein the processor-executable instructions to discover the plurality of UPnP devices are performed in response to a discovery request that is received on the first interface from a particular UE operating in the first network.

6. The proxy device of claim 1, wherein the action specified by the second identifier is further associated with a request for a data model associated with the UPnP device, the data model comprising a plurality of readable or writeable objects associated with the UPnP device,
   wherein the processor-executable instructions, to perform the action, further include processor-executable instructions to obtain the data model of the UPnP device via the second interface based on identifying the second identifier in the URL.

7. The proxy device of claim 6, wherein the processor-executable instructions to perform the action include processor-executable instructions to:
   issue a write instruction with a third identifier identifying a particular object from the plurality of readable or writeable objects, and a fourth identifier identifying a value for the particular object; and
   configure, based on the third and fourth identifiers, the particular object of the UPnP device with the value from the action, wherein configuring the particular object changes operation of the UPnP device.

8. The proxy device of claim 6, wherein the action specified by the second identifier is further associated with a request for a value associated with a particular object from the plurality of readable or writeable objects,
   wherein the processor-executable instructions to perform the action include processor-executable instructions to:
      issue a read instruction identifying the particular object from the plurality of readable or writeable objects;
      obtain a value for the particular object from the UPnP device over the second interface; and
      provide the value to a particular UE via the first interface.

9. The proxy device of claim 1, wherein the UPnP device is a first UPnP device operating on the second network, wherein the HTTP message is a first HTTP message, wherein the action is a first action, wherein the URL is a first URL, and wherein the processor-executable instructions further include processor-executable instructions to:
   receive, on the first interface, a second HTTP message comprising a second URL that includes:
      a third identifier identifying a second UPnP device on the second network, and
      a fourth identifier specifying a second action to perform with respect to the second UPnP device, wherein the second action is different from the first action performed with respect to the first UPnP device;
   determine, based on the third identifier, a different address, in the second address space, that is associated with the second UPnP device; and
   perform, using the different address and the second interface, the second action with respect to the second UPnP device on the second network.

10. The proxy device of claim 9, wherein the processor-executable instructions further include processor-executable instructions to:
identify that the second identifier, included in the first URL, is associated with a GetValues( )action with a parameter to return a value from an object of the first UPnP device to the second interface of the proxy device, wherein performing the first action includes performing the GetValues( )action with respect to the first UPnP device; and
identify that the fourth identifier, included in the second URL, is associated with a SetValues( )action with a parameter to write a value to an object of the second UPnP device, wherein performing the second action includes performing the SetValues( )action with respect to the second UPnP device.

11. A non-transitory computer-readable medium, storing a set of processor-executable instructions, which, when executed by one or more processors of a proxy device, cause the one or more processors to:
receive, on a first interface of the proxy device connected to a first network that utilizes a first address space, a Hyper Text Transfer Protocol ("HTTP") message comprising a Uniform Resource Locator ("URL"), the URL comprising:
a first identifier identifying a Universal Plug and Play ("UPnP") device on a second network that utilizes a second address space that is different from the first address space, and
a second identifier specifying an action to perform with respect to the UPnP device;
determine, based on the first identifier, a particular address, in the second address space, that is associated with the UPnP device on the second network, wherein the first identifier and the particular address associated with the UPnP device are different; and
perform the action, using the determined particular address in the second address space and from a different second interface of the proxy device that is connected to the second network, with respect to to the UPnP device on the second network.

12. The non-transitory computer-readable medium of claim 11, wherein the processor-executable instructions further include processor-executable instructions to:
discover a plurality of UPnP devices on the second network based on messaging obtained on the second interface, wherein the plurality of UPnP devices comprises the UPnP device.

13. The non-transitory computer-readable medium of claim 12, wherein the processor-executable instructions to discover the plurality of UPnP devices include processor-executable instructions to:
receive a different address, in the second address space, and identifier for each UPnP device of the plurality of UPnP devices.

14. The non-transitory computer-readable medium of claim 13, wherein the processor-executable instructions further include processor-executable instructions to:
provide the different address and identifier for each UPnP device of the plurality of UPnP devices to a particular UE operating in the first network via the first interface.

15. The non-transitory computer-readable medium of claim 12, wherein the processor-executable instructions to discover the plurality of UPnP devices are executed in response to a discovery request that is received on the first interface from a particular UE operating in the first network.

16. A method comprising:
receiving, on a first interface of the proxy device connected to a first network that utilizes a first address space, a Hyper Text Transfer Protocol ("HTTP") message comprising a Uniform Resource Locator ("URL"), the URL comprising:
a first identifier identifying a Universal Plug and Play ("UPnP") device on a second network that utilizes a second address space that is different from the first address space, and
a second identifier specifying an action to perform with respect to the UPnP device;
determining, based on the first identifier, a particular address, in the second address space, that is associated with the UPnP device on the second network, wherein the first identifier and the particular address associated with the UPnP device are different; and
performing the action, using the determined particular address in the second address space and from a different second interface of the proxy device that is connected to the second network, with respect to the UPnP device on the second network.

17. The method of claim 16, further comprising:
discovering a plurality of UPnP devices on the second network based on messaging obtained on the second interface, wherein the plurality of UPnP devices comprises the UPnP device.

18. The method of claim 17, wherein the action specified by the second identifier is further associated with a request for a data model associated with the UPnP device, the data model comprising a plurality of readable or writeable objects associated with the UPnP device,
wherein performing the action further comprises obtaining the data model for each of the plurality of UPnP devices on the second interface in response to said discovering.

19. The method of claim 18, wherein performing the action comprises:
issuing a write instruction with a third identifier identifying a particular object from the plurality of readable or writeable objects, and a fourth identifier identifying a value for the particular object; and
configuring, based on the third and fourth identifiers, the particular object of the UPnP device with the value from the action, wherein the configuring changes operation of the UPnP device.

20. The method of claim 18, wherein performing the action comprises:
issuing a read instruction identifying a particular object from the plurality of readable or writeable objects;
obtaining a value for the particular object from the UPnP device over the second interface; and
providing the value to a particular UE via the first interface.

* * * * *